K. KAELBLE.
TRANSFER INK.
APPLICATION FILED SEPT. 14, 1912.
1,194,743. Patented Aug. 15, 1916.
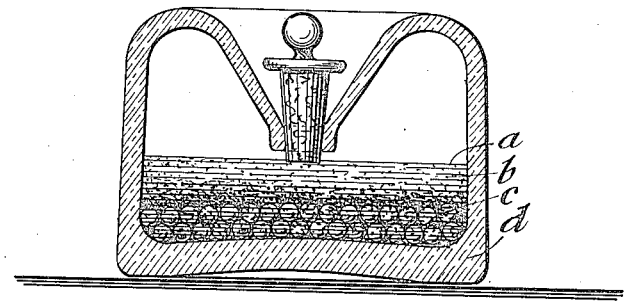
Witnesses:
John Murtagh
M. A. Dillon
Inventor
Karl Kaelble
By his Attorneys
Samuel Goepel

UNITED STATES PATENT OFFICE.

KARL KAELBLE, OF NEW YORK, N. Y.

TRANSFER-INK.

1,194,743.  Specification of Letters Patent.  Patented Aug. 15, 1916.

Application filed September 14, 1912. Serial No. 720,368.

*To all whom it may concern:*

Be it known that I, KARL KAELBLE, a citizen of the German Empire, residing in New York, borough of Manhattan, in the State of New York, have invented certain new and useful Improvements in Transfer-Inks, of which the following is a specification.

This invention relates to transfer ink by means of which designs of any nature, once produced in the ink upon any suitable surface, may be transferred from said surface to another surface or surfaces, there to be utilized for any desired purpose.

The invention consists of a transfer ink comprising a non-pigment-binding liquid medium, and a finely-divided pigment in suspension in said liquid medium.

The invention consists further in means for maintaining the pigment in suspension for such periods of time as will enable the ink to be advantageously used in practice; and in means for restoring the pigment to suspension when after long standing it has settled so as to render the ink unsuitable for immediate use.

Referring to the accompanying drawing, which shows in vertical section an inkwell containing ink embodying the invention, the ink comprises a liquid medium *a*, and a suitable pigment *b*, such as finely-divided carbon, in suspension therein.

The liquid medium is of such nature that upon drying on the surface to which the ink is applied, the carbon is not bound to the said surface against partial removal by contact of another surface therewith, but is left free, so that upon pressure of said second or transfer surface thereon, a portion of the dry carbon will adhere to and be carried off by said transfer surface. Distilled water furnishes a suitable medium.

When water alone is used as the medium, and carbon as the pigment, the comparatively high specific gravity of the carbon causes the same to settle in the lower part of the container, *d*, with such rapidity as to render shaking of the container necessary previous to each dipping of the pen, if lines of uniform shade are to be obtained. For longer maintaining the pigment in suspension, a substance may be added to the liquid, which by solution therein will increase its specific gravity, thus reducing the difference between the specific gravity of the liquid medium and the pigment, and causing the latter to remain longer in suspension.

It is essential that such added substance shall, like the liquid itself, be a non-pigment-binding substance, that is to say, one which when added to the liquid will not cause the resulting medium to become a pigment-binding medium. Common salt, NaCl, is such a substance when used in connection with water as the liquid. Sodium bicarbonate is also a suitable substance for this purpose. When such substance is used, the fluidity of the ink is affected according to the quantity employed, but is in no case of objectionable thickness even though the gravity-increasing substance be used for saturation of the liquid. The addition of such gravity-increasing substance retards the settling of the carbon for such periods of time as to preserve the surface portion of an ink of ordinary density in fit condition for use for practicable periods, say 15 to 20 minutes. A manual shaking of the container at such intervals of time restores the carbon to uniform distribution throughout the liquid medium, and renders the ink in proper condition for continued use.

When the ink, either with or without the gravity-increasing substance, is allowed to stand for a considerable period of time, the pigment, or the greater part thereof, settles to the bottom of the container and forms there a sediment of much density. Said sediment is only resuspended in the liquid medium with difficulty, as the top only of the deposit, which is a small portion of the mass, is at any one time exposed to the washing action of the liquid when the container is shaken, so that the suspension of the carbon in the liquid is only slowly restored. In order to enable the suspension to be restored quickly, there is provided in the liquid medium a solid material having a specific gravity greatly in excess of the specific gravity of the carbon or other pigment employed, and in particles of comparatively larger size. This material sinks to the bottom of the container in advance of the body of pigment, when the ink is placed in the container, and said material is not carried off by the pen, but remains at the bottom of the container and receives the gradually-settling pigment. When, now, the container is shaken, the said solid material is agitated and moves in itself, and thereby instantly breaks up the sediment, and exposes the same in broken condition to the liquid medium. The particles of the agitating material grind between themselves, and between themselves and the container-bottom and walls, the caked masses of pigment, and rapidly break them into finely-divided particles capable of resuming suspension in the liquid medium. Such an agitating substance may be, for example, lead shot c of any suitable size, or any other suitable material which has no deleterious effect on the liquid medium or upon the pigment employed. Such material reduces the manual shaking required at each interval during continuous use of the ink so that only a slight shaking of the container is necessary to keep the ink in condition for use. The finely-divided carbon has a tendency to agglomerate in the water into minute lumps of permanent hard character, of such size as to render impossible the drawing of a fine line with the ink. The ink would thereby in a short space of time be rendered unfit for use. But by the grinding action of the shot upon the carbon, the lumps of carbon are broken, and the ink is thereby maintained in condition.

The quantity of pigment employed depends upon the nature of the liquid medium and of the pigment, and of the character of lines desired to be made, and the number of copies to be reproduced. When a large number of transfers are to be made and fine lines are not desired, the ink may be made thick by the addition of carbon. When fine lines are desired, a less quantity of carbon or other pigment is used, so that a free-flowing ink is obtained.

When it is desired to copy an original drawing or portion of such a drawing, which is not made in transfer ink, a tracing is made of the original, by placing a piece of tracing cloth or paper over the original, and tracing the drawing thereon with the new ink. The tracing having been permitted to dry, is placed upon a firm supporting surface, a transfer-sheet composed of tracing cloth is placed rough side down thereon, and by manually rubbing upon the upper side of the transfer-sheet with a rounded instrument or stick, the design is caused to be transferred in reverse from the tracing to said transfer-sheet, on which it appears in free carbon which has been by pressure removed from the tracing. The transfer-sheet takes up the carbon of each line in fine particles, and shows the same as a succession of fine dots having the appearance at short distance of a continuous line in true reverse facsimile of the original. The appearance of the reverse is somewhat as though drawn with a lead pencil. The thus-obtained transfer-sheet is now placed face down upon the paper, bristol-board or other surface on which the copy is to be made, so as to bring the carbon design thereon in contact with the copy-surface. By a similar operation of rubbing the upper side of the transfer-sheet with a rounded instrument or suitable stick the design is transferred to the copy-surface, on which it appears in black lines as though drawn with the lead pencil. The design thus formed on the new surface serves as a guide for the draftsman, who then inks in the design in the usual manner. The carbon particles of the transfer ink on the copy-surface do not in any manner interfere with the taking of the permanent ink by the paper. In case a part of the design should not be required, it may be erased from the copy-surface in the same manner as a lead pencil line, leaving no trace of the undesired part. Tracing cloth has the advantage when employed as transfer material of not stretching under repeated rubbing, whereby the design is reproduced always in exactly the size and proportions of the original. In this respect it is superior to tracing paper, which commonly stretches beyond the limits allowed for faithful reproduction. Any suitable material may however be employed for the transfer material; and in case slight stretching is unobjectionable, paper or other yielding material may be used.

The same transfer-sheet will serve to make additional copies, by the same operation of surface contact produced by rubbing the upper side of the transfer-sheet, until the carbon on the transfer-sheet is so reduced as to make no further useful copies. Four or five useful copies may thus be obtained. A new transfer-sheet may then be prepared from the tracing by the same operation of surface contact, and further copies produced from that transfer-sheet. Thus, the same tracing, by yielding repeated transfers, will furnish a large number of copies, until it is itself reduced so as to no longer give a transfer sheet of working strength.

The duplication of designs having sides or portions in counterpart, and of borders, is by the new ink greatly assisted, as only one part of the design need be traced. The whole design is reproduced on the copy-sheet from the traced portion by successive transfers.

In case the original drawing which it is desired to copy be made with the transfer ink, then no tracing of the same is required, and it is only necessary to make from said original a transfer on tracing cloth or other suitable material, and then make a copy from this transfer upon the copy-surface, both operations being accomplished by the surface contact method described.

I claim:

1. A transfer ink, comprising water, a finely-divided pigment therein, said pigment being of a specific gravity incapable of suspension in the water for periods of practicable working, and a non-pigmentbinding substance in solution in the water increasing the specific gravity thereof to the point of practicable support of the pigment.

2. A transfer ink, comprising distilled water, finely-divided carbon therein, and common salt dissolved in the water to the point of suspension of the carbon for periods of practicable working.

3. As an article of manufacture, a container and a transfer ink contained therein, including a finely divided pigment which has a tendency to agglomerate, a non-pigment-binding liquid medium incapable by itself of holding the pigment in suspension for practical working periods, a non-pigment-binding substance in solution in said medium increasing the specific gravity thereof to the point of practicable support of the pigment, and a non-soluble abrading mass disposed in said medium and adapted to break up the agglomerated pigment.

4. A transfer ink, comprising a non-pigment-binding liquid medium, a finely divided pigment therein, said pigment being of a specific gravity incapable of suspension in the medium for periods of practicable working, and a non-pigment-binding substance in solution in said medium increasing the specific gravity thereof to the point of practicable support of the pigment.

5. A transfer ink, comprising a non-carbon-binding liquid medium, finely divided carbon therein, and common salt dissolved in said medium to the point of suspension of the carbon for periods of practicable working.

In testimony, that I claim the foregoing as my invention, I have signed my name in presence of two subscribing witnesses.

KARL KAELBLE.

Witnesses:
JOHN MURTAGH,
M. A. DILLON.